(12) United States Patent
Hershey et al.

(10) Patent No.: US 11,776,037 B2
(45) Date of Patent: Oct. 3, 2023

(54) SYSTEMS AND METHODS FOR PERSONAL TASTE RECOMMENDATION

(71) Applicant: Inculab LLC, Rockville, MD (US)

(72) Inventors: Blake Hershey, Rockville, MD (US); Edward Newell, Rockville, MD (US)

(73) Assignee: Inculab LLC, Rockville, MD (US)

( * ) Notice: Subject to any disclaimer, the term of this patent is extended or adjusted under 35 U.S.C. 154(b) by 0 days.

(21) Appl. No.: 16/647,862

(22) PCT Filed: Mar. 12, 2020

(86) PCT No.: PCT/US2020/022483
§ 371 (c)(1),
(2) Date: Mar. 16, 2020

(87) PCT Pub. No.: WO2020/186114
PCT Pub. Date: Sep. 17, 2020

(65) Prior Publication Data
US 2021/0398185 A1 Dec. 23, 2021

Related U.S. Application Data

(60) Provisional application No. 62/817,379, filed on Mar. 12, 2019.

(51) Int. Cl.
*G06Q 30/0601* (2023.01)
*G06V 30/413* (2022.01)
(Continued)

(52) U.S. Cl.
CPC ......... *G06Q 30/0631* (2013.01); *G06N 3/048* (2023.01); *G06N 3/08* (2013.01);
(Continued)

(58) Field of Classification Search
CPC .................................................. G06Q 30/0631
See application file for complete search history.

(56) References Cited

U.S. PATENT DOCUMENTS 9,256,805 B2   2/2016  Lindsay
9,449,077 B2 †  9/2016  Dillon
(Continued)

FOREIGN PATENT DOCUMENTS

EP      2930672 A1      10/2015
JP      2005108031 A  *  4/2005
JP      2018005918 A  *  1/2018

OTHER PUBLICATIONS

International Search Report issued in International Application No. PCT/US2020/022483, dated Jul. 16, 2020, 4 pgs.
(Continued)

*Primary Examiner* — A. Hunter Wilder
(74) *Attorney, Agent, or Firm* — Polsinelli PC

(57) ABSTRACT

Disclosed herein are systems and methods for personal taste recommendation. In one implementation, an image set is obtained at a recommendation system. The image set has at least one image of a wine list menu having one or more wines for a dining location, and the image set is captured using a camera of a user device. An identified wine is generated for each of the one or more wines on the wine list menu based on a match to a known wine. A personalized wine menu unique to a particular user set for the dining location is generated by generating a personalized taste match of the particular user set for each of the one or more identified wines.

18 Claims, 15 Drawing Sheets

(51) Int. Cl.
   *G06Q 50/12*     (2012.01)
   *G06Q 30/0282*   (2023.01)
   *G06T 7/10*      (2017.01)
   *G06N 3/08*      (2023.01)
   *G06N 3/048*     (2023.01)
   *G06V 30/10*     (2022.01)

(52) U.S. Cl.
   CPC ..... *G06Q 30/0282* (2013.01); *G06Q 30/0621* (2013.01); *G06Q 30/0625* (2013.01); *G06Q 50/12* (2013.01); *G06T 7/10* (2017.01); *G06V 30/413* (2022.01); *G06V 30/10* (2022.01)

(56) References Cited

U.S. PATENT DOCUMENTS

| | | | |
|---|---|---|---|
| 10,217,020 B1* | 2/2019 | Rivard | G06V 20/62 |
| 10,460,246 B2† | 10/2019 | Dillon | |
| 11,423,459 B1 | 8/2022 | Kirst et al. | |
| 2011/0318717 A1 | 12/2011 | Adamowicz | |
| 2012/0324350 A1 | 12/2012 | Rosenblum | |
| 2014/0122229 A1 | 5/2014 | Clark et al. | |
| 2014/0125599 A1 | 5/2014 | Seeley | |
| 2014/0324624 A1* | 10/2014 | Ward | H04W 4/021 |
| | | | 705/26.7 |
| 2014/0380286 A1* | 12/2014 | Gabel | G06F 8/20 |
| | | | 717/139 |
| 2015/0206031 A1* | 7/2015 | Lindsay | G06F 16/5866 |
| | | | 382/218 |
| 2016/0092512 A1 | 3/2016 | Wu et al. | |
| 2016/0229303 A1 | 8/2016 | Kung | |
| 2016/0284004 A1 | 9/2016 | Taylor | |
| 2018/0189636 A1 | 7/2018 | Chapela et al. | |
| 2018/0308143 A1 | 10/2018 | Chan et al. | |
| 2018/0349722 A1 | 12/2018 | Chiang et al. | |
| 2019/0065882 A1 | 2/2019 | Reinpoldt, III | |

OTHER PUBLICATIONS

Written Opinion issued in International Application No. PCT/US2020/022483, dated Jul. 16, 2020, 9 pgs.

Wine Cellar: An OCR Based Wine Recommendation Application for the Android Mobile OS, Dept. of CIS—Senior Design 2009-2010, 10 pgs.

Extended European Search Report for Application No. 20769022.3 dated Oct. 25, 2022 (9 pages).

\* cited by examiner
† cited by third party

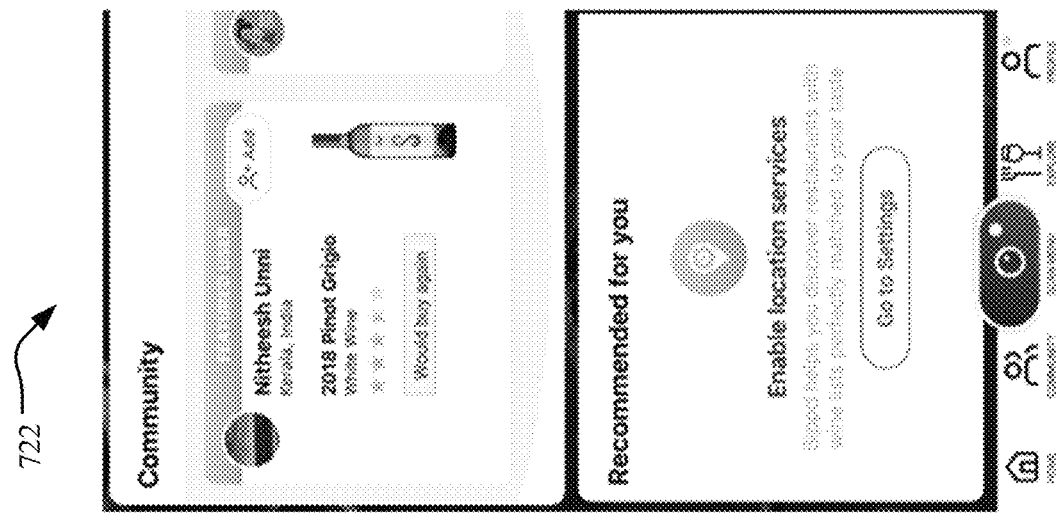
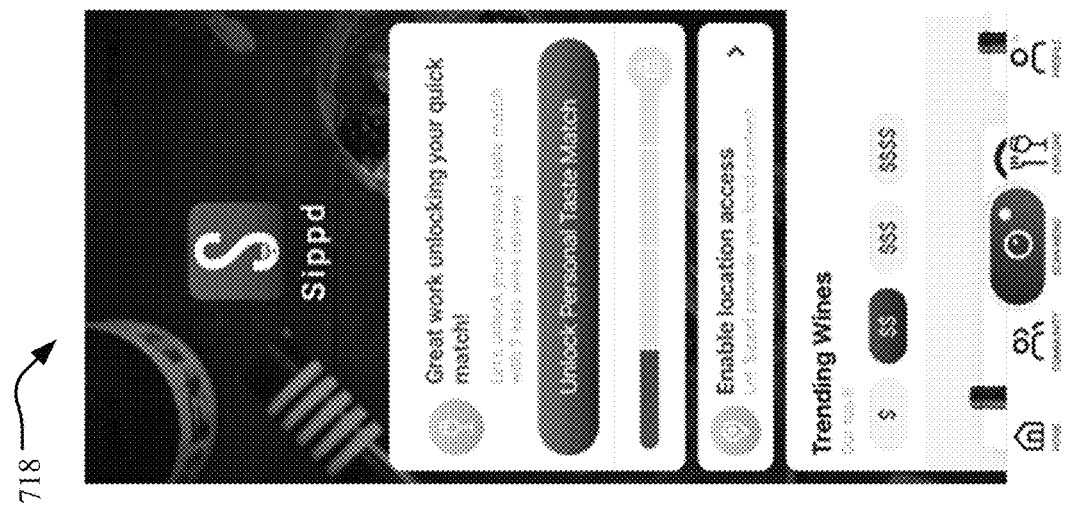
FIG. 10

SYSTEMS AND METHODS FOR PERSONAL TASTE RECOMMENDATION

CROSS-REFERENCE TO RELATED APPLICATIONS

The present application claims benefit under 35 U.S.C. § 119 to U.S. Provisional Patent Application No. 62/817,379 entitled "Systems and Methods for Personal Wine Recommendation" and filed Mar. 12, 2019, which is specifically incorporated by reference in its entirety herein.

TECHNICAL FIELD

Aspects of the present disclosure relate to personalized taste recommendations for a user or group of users and more particularly to systems and methods for recommending one or more items for a user or group of users based on a personalized taste match.

BACKGROUND

Social outings often involve a series of decisions that can be frustrating or even daunting to many individuals. For example, there may be a decision of which restaurant or bar to select followed by what to order. Alcohol ordering in particular can be a challenging ordeal. Alcohol menus typically include a wine list, beer list, cocktail list, spirit list, and/or the like. Each of these lists may involve a variety of different items with limited information, where it is difficult not only to understand the various options but also to identify an item that is suited to the individual's taste. Conventionally, an individual may rely on the expertise of others, use general reviews, or base the decision on a food pairing. However, such conventional approaches generally fail to take into account the individual's personal taste preferences. These challenges are exacerbated when trying to determine what to order for a group. It is with these observations in mind, among others, that various aspects of the present disclosure were conceived and developed.

SUMMARY

Implementations described and claimed herein address the foregoing problems by providing systems and methods for personal taste recommendation. Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

FIGS. 7-15 illustrate various example user interfaces generated by a computing device and presented on a display of a user device through which access to and interactions with the recommendation systems and methods described herein and related data are provided.

DETAILED DESCRIPTION

Figure 1:
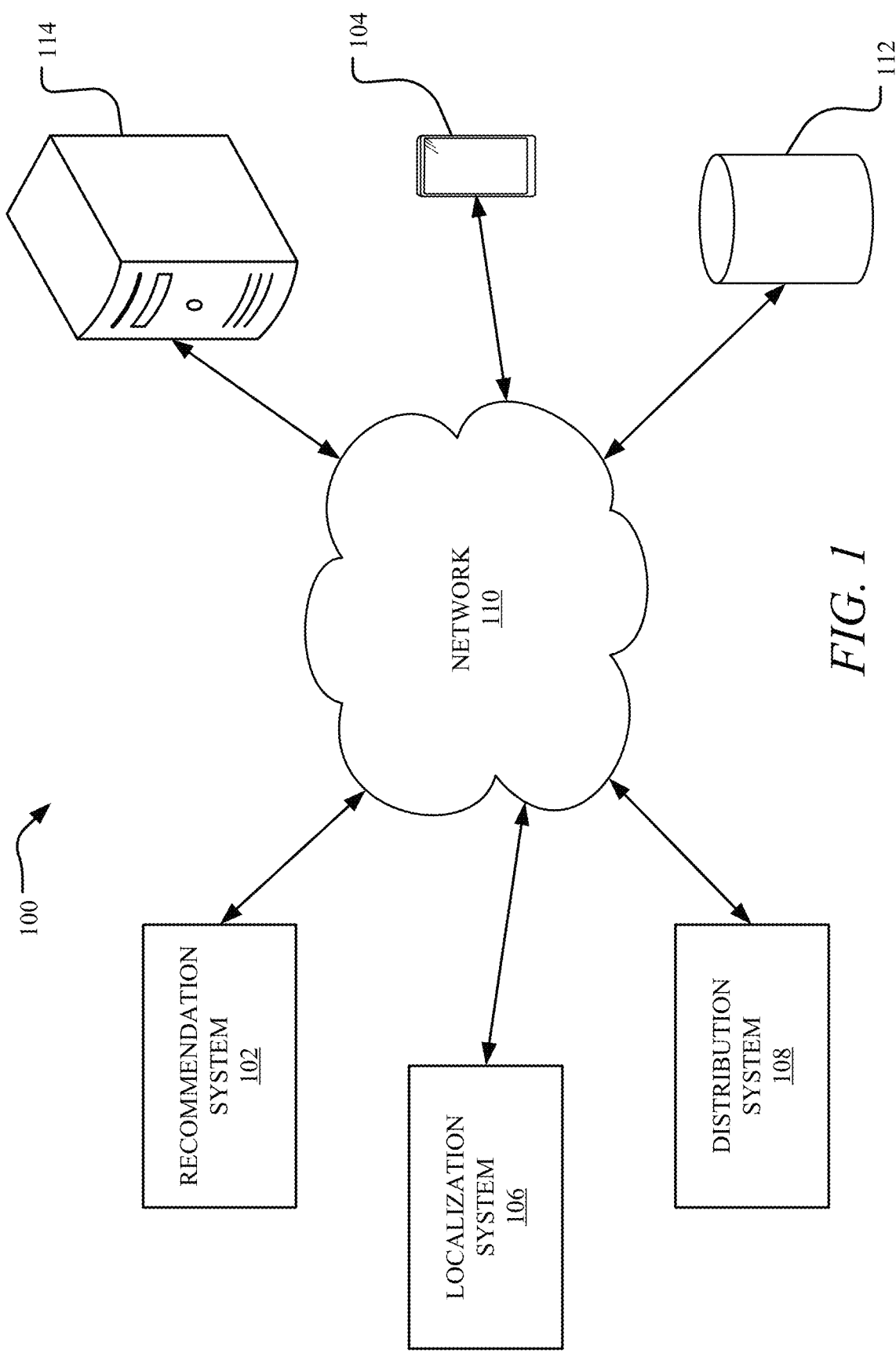
FIG. 1 illustrates an example network environment that may implement a recommendation system.

Aspects of the present disclosure involve systems and methods for personal taste recommendations using machine learning techniques. Generally, a recommendation system provides one or more personal taste recommendations for a user or group of users, such as a set of one or more personalized menu item matches, personalized restaurant matches, and/or the like. The personalized menu item matches may include, without limitation personalized wine, beer, cocktail, spirit, beverage, and/or food matches. Taking wine as an example, purchasing wine at a dining location, such as a restaurant or a bar, is often high stakes for many individuals because bottles and even glasses can be quite expensive. Individuals often rely on wait staff or a sommelier in selecting a wine. As such, the selection typically results in a wine that is merely: a top seller; intended to clear inventory; generating a higher profit to the dining location; made based on a generalized description of preferences; made based on a food pairing; based on the preferences of others; and/or the like. In general, the wine selected is driven by a single transaction without historical preference context or individualized taste preferences, thereby making it difficult for an individual to select a wine that is pleasing, experiment with new wine within the individual's taste preferences, and understand a value of a particular wine.

Overall, the presently disclosed technology uses a recommendation system to improve the individual dining experience by accounting for individual tastes and past preferences, including wine purchase history, to recommend: one or more wines that an individual will enjoy within an individualized budget; dining locations in a geographic region with wines that suit the individual's tastes; and/or the like, as well as by assisting the individual in remembering and purchasing wines that were enjoyed. Stated differently, the recommendation system provides a best selection of a menu item on a menu because the recommendation system accounts for personal tastes, preferences, past wine selections, price range, and value thresholds, as well as providing reminders of tasting notes for past wine selections, critic scores, and reviews, among other information. Further, these aspects may be considered in aggregate for a group of individuals to provide recommendations that will please the group as a whole. The presently disclosed technology may further connect users with similar tastes to facilitate a community of wine, beverage, and food exploration and enjoyment. The recommendation system may suggest stretch wine matches to explore and expand wine repertoire confidently. Generally, the recommendation system understands users' taste and budget preferences, provides more information about menu items than that listed on the menu, and accurately predicts menu items users' will like and dislike.

The various systems and methods disclosed herein generally provide for individualized recommendations for a set of one or more users. The example implementations discussed herein reference wine. However, it will be appreciated by those skilled in the art that the presently disclosed technology is applicable to other types of beverages, food, and consumer products or services.

To begin a detailed description of an example network environment 100 that may implement a recommendation system 102, reference is made to FIG. 1. Generally, a set of one or more users may be directed to a dining location, such as a restaurant or bar, through personalized geographic recommendations presented via one or more user device(s) 104 based on a match of individualized taste preferences of the set of user(s) with at least one menu item for the dining location. Stated differently, the set of user(s) may be guided to a nearby dining location that has menu items that fit the taste profile of the set of user(s) using the recommendation system 102, a localization system 106, and other systems and services of the network environment 100.

In one implementation, the localization system 106 may determine a geographic location of the user and provide recommendations based on the geographic location. For example, the user device 104 may include Global Positioning System (GPS) capabilities, and the localization system 106 may obtain the GPS data for determining a location of the user, as well as one or more dining locations within a geographic region associated with the location of the user. It will be appreciated, however, that the geographic location of the user may be determined by various localization techniques, including, but not limited to, connection of the user device 104 to one or more wireless networks, designation of a location by a user, biometric or object recognition, and/or the like. In one example, upon access of the recommendation system 102 via the user device 104, the localization system 106 may detect a location of the user device 104 and automatically identify any dining locations within a geographic region (e.g., a designated radius) of the location. In another example, the user may input a location, and the localization system 106 automatically identifies any dining locations within the geographic region of the location.

The recommendation system 102 leverages a trained neural network to provide one or more personalized taste matches of the user to the dining locations within the geographic region based on a taste profile of the user and menu items of each of the dining locations. The taste profile may include item reviews, tasting notes, user history, taste preferences, budget preferences, value thresholds, community information, and/or the like. For example, the recommendation system 102 may provide one or more recommendations of the dining locations within the geographic region of the location that have a menu with one or more wines that match the taste profile of the user. The recommendation system 102 may further provide access to the menu for each of the dining locations for presentation to the user with the user device 104. A reservation at a selected dining location may be made via the recommendation system 102 using the user device 104. The user may elect to share the taste profile with the selected dining location for customized pairings and item suggestions.

In one implementation, the recommendation system 102 and/or the localization system 106 may provide real-time location sharing and check-in using the user device 104. For example, the recommendation system 102 and/or the localization system 106 may directly or through another application or service check the user into a particular dining location and may share the check-in on a social platform. Using the social platform, the user may be connected with other users that have similar taste profiles and identify new menu items and dining locations aligned with the taste profile of the user.

At the dining location, a menu is scanned with a sensor(s) of the user device 104, and the recommendation system 102 converts the menu into an individualized menu particular to the set of user(s). The individualized menu includes personalized taste matches, such as an individual taste match or a group taste match, for one or more of the menu items, for example in the form of a percentage match, as well as additional information about the one or more menu items that may be helpful in assisting with a selection. As such, the recommendation system 102 provides filtering, sorting, and a rich comprehensive and customizable menu that is particular to the set of user(s) to pinpoint menu items based on personal tastes, budgets, value thresholds, and other preferences. As described in more detail herein, the recommendation system 102 leverages a history of item selections and reviews to refine user taste preference profiles, thereby optimizing item selection experience and providing unbiased reviews, tasting notes, pairings, and retail pricing.

The network environment 100 may further include a distribution system 108 that communicates with the recommendation system 102 to enable purchase and delivery of selected menu items. For example, the user may enjoy a particular wine at a dining location and purchase bottles of the wine for delivery via retail, e-commerce, and/or other distribution channels. Similarly, dining locations may utilize the distribution system 108 to purchase wine inventory based on an aggregated taste profile for their customers. The recommendation system 102 may anonymize user taste profiles and provide analytics to dining locations that may be filtered by item type, geographic location, dining location, demographics, taste preferences, and/or the like. Such analytics may be used for inventory and menu optimization by the dining locations. Further, the dining locations may provide targeted offers to users based on personalized taste matches and analytics. Similarly, the recommendation system 102 may generate a personalized club (e.g., wine club) to distribute items on a regular basis to the user that are uniquely matched to the taste profile of the user. In doing so, the recommendation system 102 may communicate with the distribution system 108 to facilitate ordering and delivery.

In one implementation, a user accesses and interacts with the recommendation system 102 using the user device 104 to access, generate, or otherwise interact with: user taste profiles; personalized taste matches for one or more menu items and/or dining locations in a geographic region; menu item information; and/or other information or services via a network 110.

The user device 104 is generally any form of computing device capable of interacting with the network 110, such as a personal computer, terminal, workstation, desktop computer, portable computer, mobile device, smartphone, tablet, multimedia console, and/or the like. The network 110 is used by one or more computing or data storage devices (e.g., one or more databases 112 or other computing units described herein) for implementing the recommendation system 102, the localization system 106, the distribution system 108, and other services, applications, or modules in the network environment 100. The user taste profiles, personalized taste recommendations, menu data, item data, user data, software, and other information utilized by the recommendation system 102 may be stored in and accessed from the one or more databases 112.

In one implementation, the network environment 100 includes at least one server 114 hosting a website or an application that the user may visit to access the recommendation system 102 and/or other network components of the network environment 100. The server 114 may be a single server, a plurality of servers with each such server being a physical server or a virtual machine, or a collection of both physical servers and virtual machines. In another implementation, a cloud hosts one or more components of the network environment 100. The user devices 104, the server 114, and other resources connected to the network 110 may access one or more other servers to access to one or more websites, applications, web services interfaces, storage devices, computing devices, or the like that are used for personalized taste recommendations and related services. The server 114 may also host a search engine that the recommendation system 102 uses for accessing, searching for, and modifying personalized taste recommendations, user taste profiles, underlying data, and other data, as well as for providing personalized taste recommendation services, as described herein.

Figure 2:
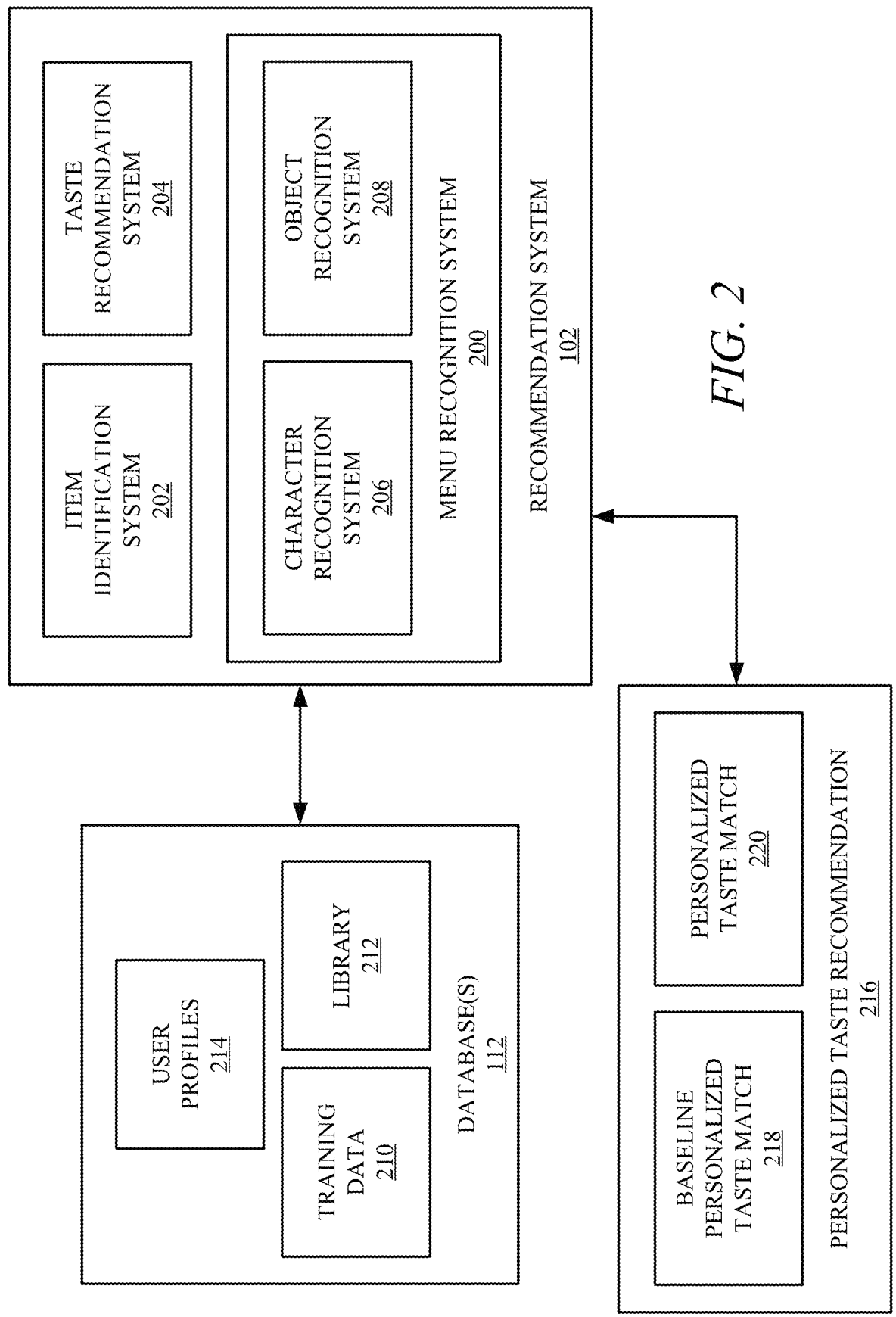
FIG. 2 shows a block diagram of various components of the network environment including the recommendation system.

Turning to FIG. 2, in one implementation, the recommendation system 102 includes a menu recognition system 200, an item identification system 202, and a taste recommendation system 204. The menu recognition system 200 may include a character recognition system 206, an object recognition system 208, and/or other systems described herein.

The menu recognition system 200 detects one or more menu items on a menu at a dining location. The item identification system 202 generates one or more queries for each menu item and matches each menu item to a known menu item within a confidence threshold to generate an identified menu item. The taste recommendation system 204 recommends one or more of the identified menu items to a user based on a personalized analysis of the identified menu items in view of a personal taste profile of the user using a trained neural network.

In one implementation, the one or more databases 112 store training data 210 for regularly training the neural network of the taste recommendation system 204, a library 212, and a user profile 214 for each user connected with or otherwise involved with the recommendation system 102. Using the information stored in the one or more databases 112, as well as any data obtained via the recommendation system 102, the recommendation system 102 outputs personalized taste recommendations 216 for an individual user or a group having a plurality of individual users. The personalized taste recommendations 216 may include a baseline personalized taste match 218 that provides an approximation of a personalized taste match 220 for a new user and the personalized taste match 220 according to one or more menu items.

Taking wine as an example of menu items in the form of wine lists for which the recommendation system 102 will provide the personalized taste recommendations 216, in one implementation, the user profiles 214 include a taste profile and one or more historical personalized taste recommendations for each user in a community associated with the recommendation system 102. Using the user profiles 214 and wine training data, such as a plurality of annotated wine lists, critic reviews, consumer reviews, competition ratings, information about quality of particular wines, information about production of particular wines, pairing information, and other information about a particular wine, the training set 210 is routinely updated and optimized. The library 212 may include vocabulary lists, such as wine item lists, non-wine item lists (e.g., food, beer, spirits, cocktails, and other menu items that are not wine), proto-wine lists, and/or the like.

In one implementation, upon logging into the recommendation system 102 via a user interface for the first time, the recommendation system 102 prompts the user to select one or more proto-wines that fit the taste preference of the user (i.e., that the user likes). The proto-wines each correspond generally to a class of wine. The wine classes underlying the proto-wines may include, without limitation, varietals (e.g., chardonnay, merlot, etc.), regional styles (e.g., Tuscany, Bordeaux, etc.), types or categories (e.g., sparkling, flat, dessert, port, etc.), and/or the like.

After the recommendation system 102 receives the user selection of one or more proto-wines fitted to the taste preference of the user, the recommendation system 102 prompts the user to complete a set of initial wine reviews (e.g., a first wine review, a second wine review, and a third wine review). The initial set of wine reviews may include a rating and an overall approval designation of each of the wines. The rating may be in the form of a star rating on a scale of one to four stars, with one star being the lowest and corresponding to a wine that the user does not like. The overall approval designation may include a yes or no indication of whether the user would buy the wine again. The initial set of wine reviews are correlated with the proto-wine selection and a user identification to generate a user profile and unlock a personal taste match.

As described herein, the neural network of the taste recommendation system 204 is routinely retrained with the training data 210, for example as new user profiles 214 are generated. Generally, the taste recommendation system 204 utilizes deep learning techniques to generate the personalized taste recommendation 216 for a particular user. In one implementation, the taste recommendation system 204 includes a learned neural network trained with the training data 210 that involves embeddings. An embedding is a mapping of discrete variables as continuous vectors or more generally a projection of inputs into a more convenient representation space. In the context of neural networks, embeddings are learned continuous vector representations of discrete variables that are low-dimensional and as such, reduce dimensionality of categorical variables to meaningfully represent the categories in transformed space. For example, the embeddings in the context of the taste recommendation system 204 may represent user preferences and wines as continuous vectors, and the neural network may be trained with the embeddings to predict how much a given user will enjoy a given wine that the user has not tried yet based on historical wine preferences and community user preferences, among other data. As each new user is added to the community and unlocks the personal taste match based on the proto-wine selection and the initial set of wine reviews, the neural network of the taste recommendation system 204 may be retrained to learn meaningful embeddings.

As the user reviews more wines, the historical wine reviews and preferences grow for the user, increasing an accuracy of the taste recommendation system 204. However, to provide the user with the personalized taste recommendations 216 upon unlocking the personal taste match, the taste recommendation system 204 may generate a baseline personalized taste match 218 for the user based on the proto-wine selection and the initial set of wine reviews. Using the learned neural network trained with embeddings from prior to the user accessing the recommendation system 102 for the first time, the user is projected into the embedding space, from which the taste recommendation system 204 generates the baseline personalized taste match 218 using the proto-wine selection and the initial set of wine reviews.

In one implementation, the baseline personalized taste match 218 is an approximation of the personalized taste match 220, which is what the taste recommendation system 204 would provide if the neural network embedding space were retrained with the new user profile. More particularly, the taste recommendation system 204 may generate the baseline personalized taste match 218 by projecting the user into the previously trained embedding space to create a minimum square error match to the proto-wine selection and the initial set of wine reviews. When the embedding space of the taste recommendation system 204 is retrained, an embedding between the user and the user taste preferences will be generated in the form of the user taste profile.

Once the user is at a dining location, the wine list of the menu for the dining location is scanned using a sensor of the user device 104 (e.g, a camera). The recommendation system 102 prompts the user via a user interface to capture the wine list menu with the sensor of the user device 104. In one implementation, an image set of one or more images of the wine list menu are captured using the sensor of the user device 104. The image set may be captured in the form of a series of one or more single image captures or in the form of a video from which the image set is extracted. The complete menu is therefore captured, even if the wine list of the menu spans a plurality of pages.

The image set of the wine list menu is obtained by the recommendation system 102 for determining what wines are included on the wine list menu and to generate the personalized taste matches 220 for one or more of the identified wines on the wine list menu. In one implementation, the library 212 includes known wine set having a plurality of known wines. Using the image set, each of the wines included on the wine list menu is identified through a match with a known wine in the library 212. How a particular wine is detailed, particularly in the context of the wine list as a whole, may vary dramatically from menu to menu, as well as differ from how the wine is described in the known wine set of the library 212. For example, the wine may be described using the varietal, regional style, brand name, winery, vintage, as well as other attributes. As such, the recommendation system 102 identifies a wine on the wine list menu by generating a wine query for a wine entry and matching the wine query to a known wine with a confidence of the match being above a threshold. The confidence threshold for generating a match provides a most likely match of the wine entry to a known wine with the presumption that it is better to return a no-match than the return an incorrect match. As such, the recommendation system 102 generates an identified wine for a wine entry in the wine list menu that provides a linking between the wine list menu and the learned neural network of the taste recommendation system 204.

In one implementation, the image set of one or more images of the wine list menu is obtained at the menu recognition system 200. The character recognition system 206 may utilize optical character recognition (OCR) to convert the image set of the wine list menu into machine-encoded text. While the character recognition system 206 generates wine list text for the wine list menu from the image set using OCR, wine list menus are typically unbounded and vary greatly in presentation. For example, a single wine entry may be in a single line or spread across multiple lines; wine entries may be in one or more columns; wine entries may be tightly grouped or spread apart; and/or be listed alongside non-wine items, such as food and other beverages, among other variations. In one implementation, the character recognition system 206 links the text to coordinates within an image to add structure to the text extraction. Where the menu recognition system 200 determines that each wine entry on the wine list menu is on a single line, the character recognition system 206 may output the wine list text to the item identification system 202 to identify each of the wine entries.

In another implementation, the image set of the wine list menu is processed through the character recognition system 206 and the object recognition system 208 in parallel pipelines. The character recognition system 206 generates wine list text by extracting text from the image set of the wine list menu through OCR. The wine list text may lack an indication of a number of wine entries, boundaries between the wine entries, and what characters in the text are relevant, as well as contain errors. Thus, simultaneously or otherwise in parallel with the generation of the wine list text, the object recognition system 208 determines a layout of the wine list menu and segments the wine list menu into individual orderable entries. An individual orderable entry represents a single item on the menu. In one implementation, the object recognition system 208 generates a bounding box around each individual orderable entry, where all the characters inside the bounding box correspond to a single menu item. The object recognition system 208 may utilize a region-based convolutional neural network (RCNN), a You Only Look Once (YOLO) convolutional neural network, and/or the like to identify each individual orderable entry.

The parallel pipelines of the character recognition system 206 and the object recognition system 208 may merge through an itemization process. During itemization of the wine list menu, the wine list text is merged with the bounding boxes generated during segmentation. The character recognition system 206 determines what text is present, and the object recognition system 208 determines how that text is broken up into individually spatially indicated wine items. Thus, during itemization, the menu recognition system 200 maps the segmented entries over the wine list text to generate entry text for the individual orderable entries. For example, a first bounding box generated by the object recognition system 208 determines indicates a region on the menu in which a first individual orderable entry appears on the wine list menu. The subset of wine list text within the first bounding box describes the first individual orderable entry. Thus, during itemization, the menu recognition system 200 identifies first entry text for the first individual orderable entry. Each of the individual orderable entries for the wine list menu are input into the item identification system 202 for deconfliction, screening, and down-spelling to generate a wine entry query for matching to a known wine in the library 212.

As detailed herein, menus may vary dramatically from dining location to dining location. In some instances, other menu items, such as food or other beverage items may appear in the same areas as wine items. Thus, in one implementation, the item identification system 202 removes any overlapping text or entries during deconfliction and filters any irrelevant text during screening. For example, entry text for each individual orderable entry may be compared to a library of irrelevant vocabulary detailing non-wine items, such as food items, non-wine beverage items, and other text that does not describe wine. After any non-wine entries are removed through matching of entry text for each individual orderable entry to irrelevant vocabulary, a set of one or more wine entries remains in a wine entry list corresponding to the wine list menu.

Additionally, a single wine may be spelled or described with a variety of different manners, thereby making it difficult to link a wine on a wine list menu to the embedded space of the taste recommendation system 204, which is exacerbated with any errors in the text identified through OCR. Thus, down-spelling is used to generate an identified wine entry by correcting the description of the wine based on known wine vocabulary. In one implementation, in connection with down-spelling, a query is generated for each of the wine entries to generate an identified wine for a wine entry in the wine list menu through a match to a known wine in the library 212. Structure may be added to each wine entry during down-spelling using tokens. A token represents any bit of text separated by a space, including words, numbers, and other text characters. Based on the wine vocabulary in the library, the item identification system 202 determines a token type for each token. A token type may correspond to a wine attribute, such as varietal, regional style, brand name, winery, vintage, and/or the like.

Using the tokens and corresponding token types, the item identification system 202 generates a wine query for each wine entry to query the known wine vocabulary in the library 212. By matching one or more of the tokens in a query string for each wine query to known vocabulary using the token types, the item identification system 202 outputs a ranking of one or more potential matches of the wine entry to a known wine. The ranking may be generated using a search engine, such as a multitenant-capable full-text search engine, and list known wines in a logical order of potential matches to the wine query. A highest ranking known wine in the ranking may represent the known wine most likely to be a match to the wine query, with each known wine in the ranking being progressively less likely to be a match.

In one implementation, in generating the ranking, a first set of token types may be weighted more than a second set of token types. The first set of token types may involve wine attributes that are more distinguishing, such that if the token matches the corresponding attribute of the known wine, it is more likely to be a true match. For example, a brand name or winery name may be included in the first set of token types. On the other hand, varietals, regional types, vintages, and/or the like are not unique to a particular wine, and as such, may be included in the second set of token types that are less distinguishing and assigned a lower weight in ranking. It will be appreciated that the first and second token types are exemplary only and that various wine attributes, such as brand name, winery, country, regional type, varietal, vintage, etc., may have varying levels of weighting in connection with the token types.

For each wine query, the ranking of potential matches of known wines is generated, and the item identification system 202 iterates through the ranking from top to bottom (starting at highest ranked) applying heuristics based on the weighting to determine a match, if any. The heuristics are applied to generate a precision oriented match, such that a no-result is better than a wrong result. Accordingly, the item identification system 202 generates an identified wine based on a match of the wine query to a known wine that exceeds a confidence threshold. The item identification system 202 generates an identified wine for each wine entry on the wine list menu, if possible.

If no identified wines are generated, the item identification system 202 informs the user via a user interface on the user device 104 that there are no recommendations for the wine list menu. Otherwise, the one or more identified wines for the wine list menu are obtained by the taste recommendation system 204 to generate the personalized taste recommendations 216. As described herein, the personalized taste recommendations 216 for returning users may include the personalized taste match 220 of the user taste preferences to one or more of the identified wines.

In one implementation, the taste recommendation system 204 utilizes an alternating least square method with offsets in connection with the learned neural network to generate an internal score for the one or more identified wines. The internal score generally represents a predicted star rating that the user would assign to an identified wine if they were to taste and review the wine based on the history of the user and a plurality of other users considered together.

A translation layer of the taste recommendation system 204 converts the internal score for an identified wine for a particular user into semantically meaningful representation in the form of the personalized taste match 220. In one implementation, the personalized taste match 220 is provided as a percentage match. The taste recommendation system 204 may generate the personalized taste match 220 through a non-linear transformation using a sigmoid function to translate the internal score to a percentage match on a scale ranging from a minimum threshold to a maximum threshold. The percentage match may be prevented from exceeding the maximum threshold. On the other hand, while the percentage match may fall below the minimum threshold, if the identified wine has a percentage match below the minimum threshold, the identified wine may be filtered from the results of the personalized taste matches 220. The scale may include a dynamic range in which distinctions between percentage matches carry more weight and semantically meaningful. For example, the scale may range from 0-100, with the minimum threshold being 50 and the maximum threshold being 100. With the percentage matches ranging from 50-100, the dynamic range may be 80-95, in which the majority of percentage matches fall, such that each value difference carries greater weight. The taste recommendation system 204 outputs a personalized wine list menu unique to the particular user that includes the identified wines of the wine list menu in connection with the personalized taste match 220 of the particular user for each of the identified wines. In addition to the personalized taste match 220 for each of the identified wines, there may be a expand option for the user to click to expand the detail provided for an identified wine, such as other users' ratings, critic ratings, wine attributes, description, vintage, common pairings, and/or the like.

As described herein, in one implementation, the recommendation system 102 may provide the personalized taste recommendation 216 for a group of users, taking into account the unique taste preferences of each user in the group. Stated differently, the recommendation system 102 may generate a single personalized wine list menu with personalized taste matches 220 for each identified wine for the group as a whole. To generate such a group personalized wine list menu, individual personalized taste matches 220 for each identified wine are generated for each user in the group as detailed herein. For each identified wine, an internal group score is generated based on a normalization of each of the individual internal scores for each user considered in aggregate. The normalization may be performed through an averaging function, such as an arithmetic mean, a harmonic mean, or a geometric mean, or other normalization functions. In one implementation, negative internal scores are assigned a greater weight during normalization than higher internal scores to ensure that the group personalized taste matches 220 for each identified wine represents a totality of the group, rather than an average of extremes. For example, if everyone in the group will enjoy a wine to some level, that wine will have a higher group percentage match than a wine that some in the group will love and some will hate.

Members of a group may be identified in various manners. For example, one user may add the others into a group manually, such that while that user controls the recommendation system 102, the user profiles 214 of each user is considered in generating the group personalized taste match. Group members may be additionally or alternatively identified based proximity of user devices, check-ins, reservations, and/or the like.

Following a selection of an identified wine, the recommendation system 102 may prompt the user or group of users to submit a review of the wine. The review of the wine may include a rating and an overall approval designation of the wine. The rating may be in the form of a star rating on a scale of one to four stars, with one star being the lowest and corresponding to a wine that the user does not like. The overall approval designation may include a yes or no indication of whether the user would buy the wine again. The recommendation system 102 may provide the user with an option to review the wine now or later, as well as an option to order the wine for delivery via the distribution system 108. There may further be an option to add additional wine attributes or detail about the wine, including vintage, tasting notes, and/or the like.

In one implementation, the recommendation system 102 may obtain the identified wines for other users that are not at the dining location but are either located within the geographic region of the dining location or searching within the geographic region of the dining location. As such, the taste recommendation system 2104 may generate personalized taste recommendations 216 for such users in the form of dining location taste matches. Stated differently, using the identified wines generated from a user at the dining location scanning the wine list menu or generated from an online wine list menu for the dining location obtained over the network 110, the recommendation system 102 may present various users with nearby dining locations that have wines that would be within the taste preferences of the users. Such dining location taste matches may be presented as a personalized taste match 220 generated for the dining location as a whole or presented as a list of personalized taste matches 220 for individual wines on a personalized wine list menu for the dining location. The recommendation system 102 may determine when a user is within a certain geographic location and will pull dining locations having wines with a percentage match over a threshold. Thus, the recommendation system 102 may identify a dining location within a designated geographic region that has wines that map most highly to a user or group of users or may identify wines from a wine list menu at a dining location that map most highly to taste preferences of a user or group of users.

Figure 3:
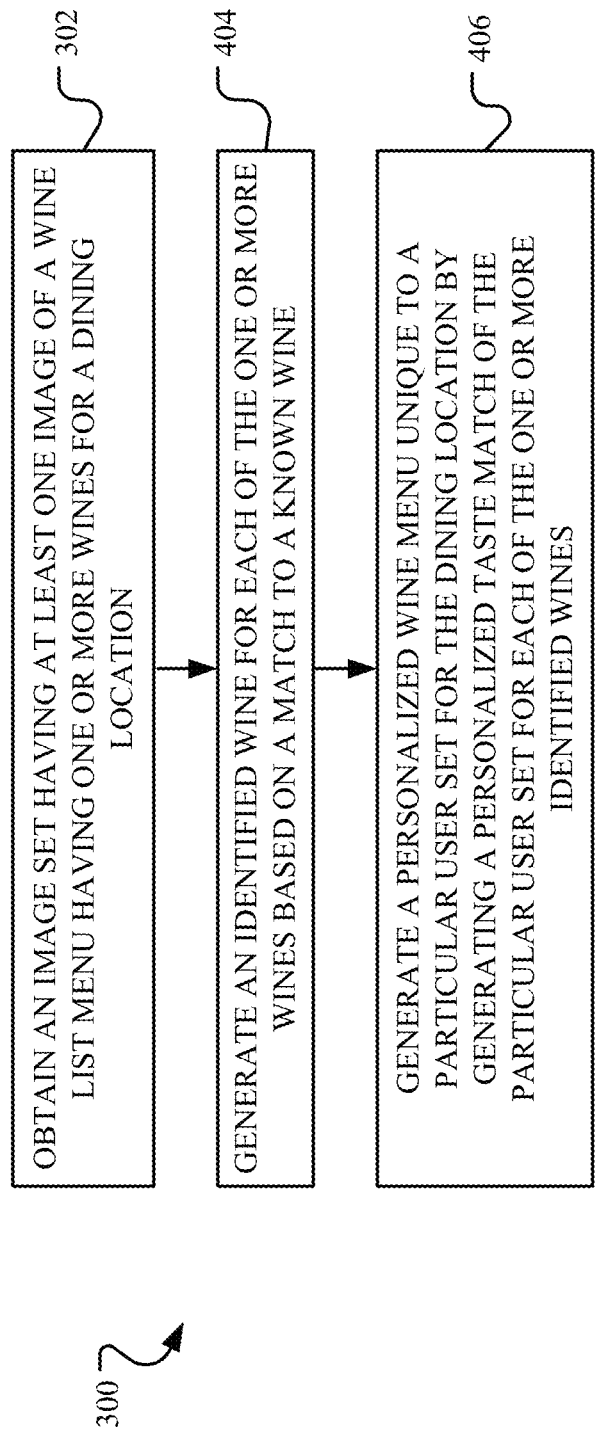
FIG. 3 illustrates example operations for personalized taste recommendation.

FIG. 3 illustrates example operations 300 for personalized taste recommendation. In one implementation, an operation 302 obtains an image set at a recommendation system. The image set has at least one image of a wine list menu having one or more wines for a dining location, and the image set is captured using a camera of a user device. An operation 304 generates an identified wine for each of the one or more wines on the wine list menu based on a match to a known wine. An operation 306 generates a personalized wine menu unique to a particular user set for the dining location by generating a personalized taste match of the particular user set for each of the one or more identified wines. It will be appreciated that wines are exemplary only and the operations 300 are applicable to other beverages, foods, or products or services.

Figure 4:
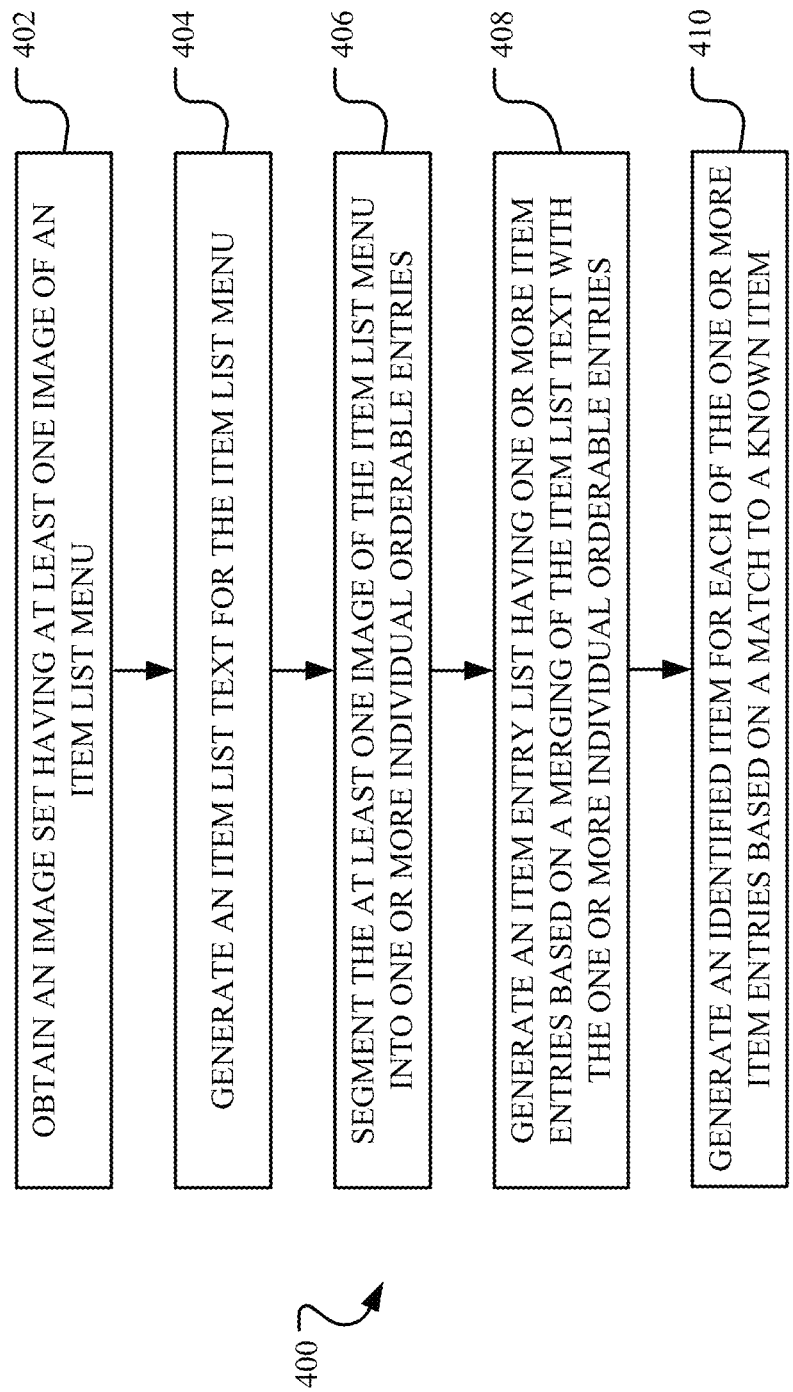
FIG. 4 depicts example operations for menu recognition.

Referring to FIG. 4, example operations 400 for menu recognition are illustrated. In one implementation, an operation 402 obtains an image set at a recommendation system. The image set has at least one image of an item list menu for a dining location, and the image set is captured using a camera of a user device. An operation 404 generates an item list text for the item list menu by converting the at least one image of the item list menu into extracted text, and an operation 406 segments the at least one image in the image set of the item list menu into one or more individual orderable entries. An operation 408 generates an item entry list having one or more item entries based on a merging of the item list text with the one or more individual orderable entries, and an operation 410 generates an identified item for each of the one or more item entries based on a match to a known item.

Figure 5:
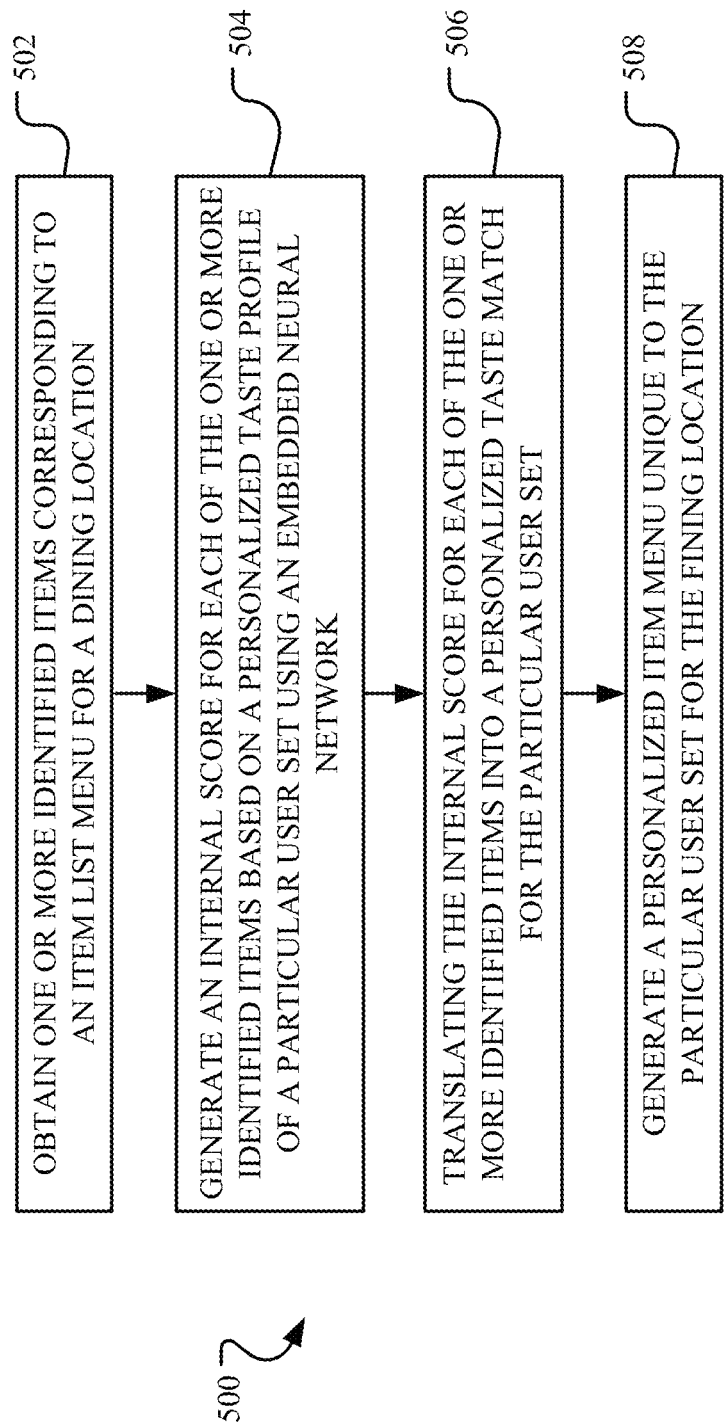
FIG. 5 shows example operations for recommending one or more menu items.

FIG. 5 shows example operations 500 for recommending one or more menu items. In one implementation, an operation 502 obtains one or more identified items corresponding to an item list menu for a dining location, and an operation 504 generates an internal score for each of the one or more identified items based on a personalized taste profile of a particular user set using an embedded neural network. An operation 506 translates the internal score for each of the one or more identified items into a personalized taste match for the particular user set. An operation 508 generates a personalized item menu unique to a particular user set for the dining location. The personalized item menu including the personalized taste match for the particular user set for each of the one or more identified items.

Figure 6:
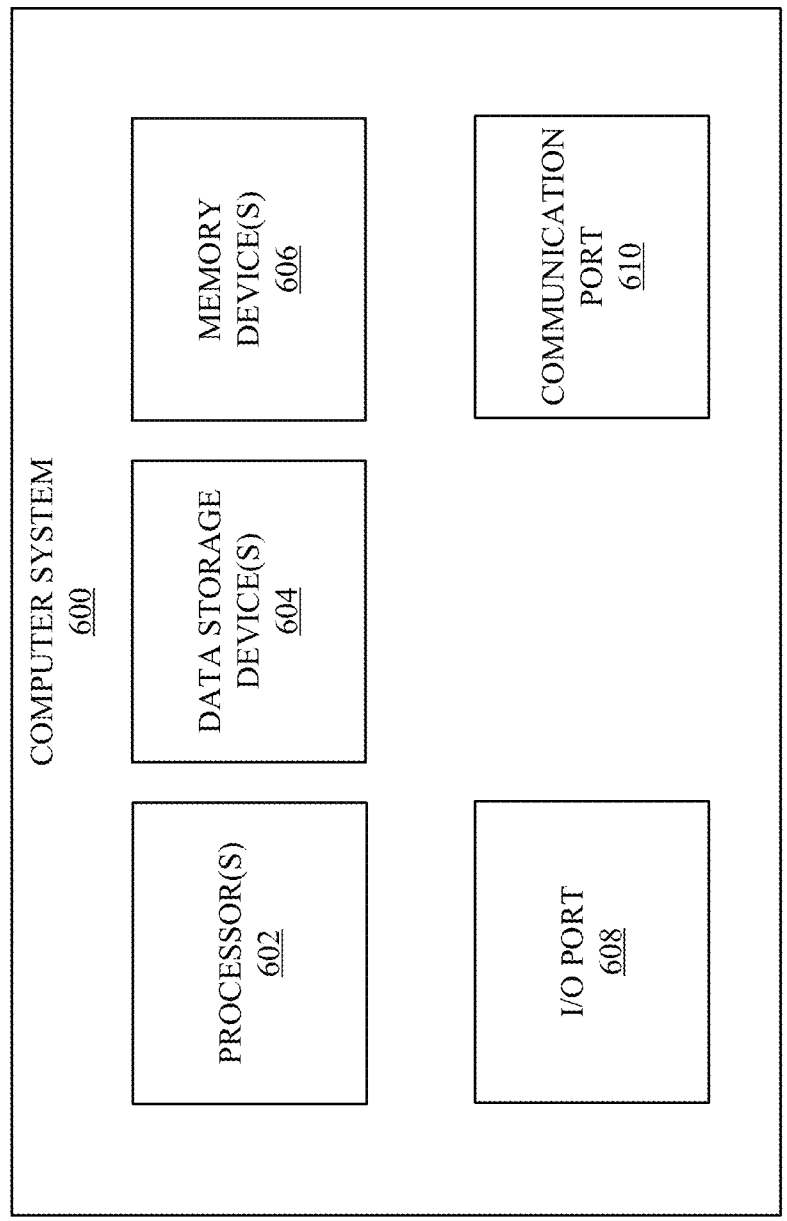
FIG. 6 is an example computing system that may implement various systems and methods discussed herein.
Figure 7:
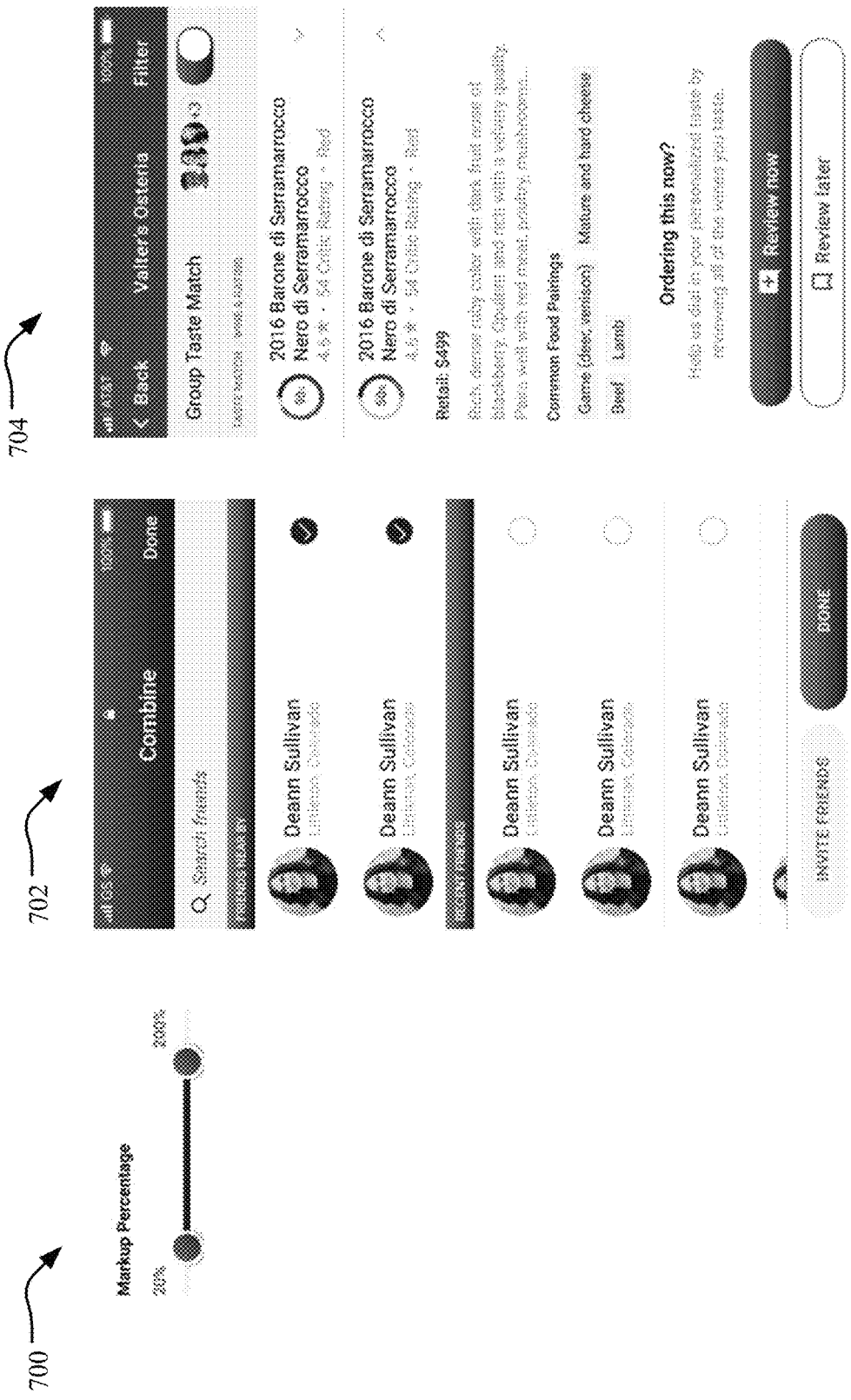
Figure 8:
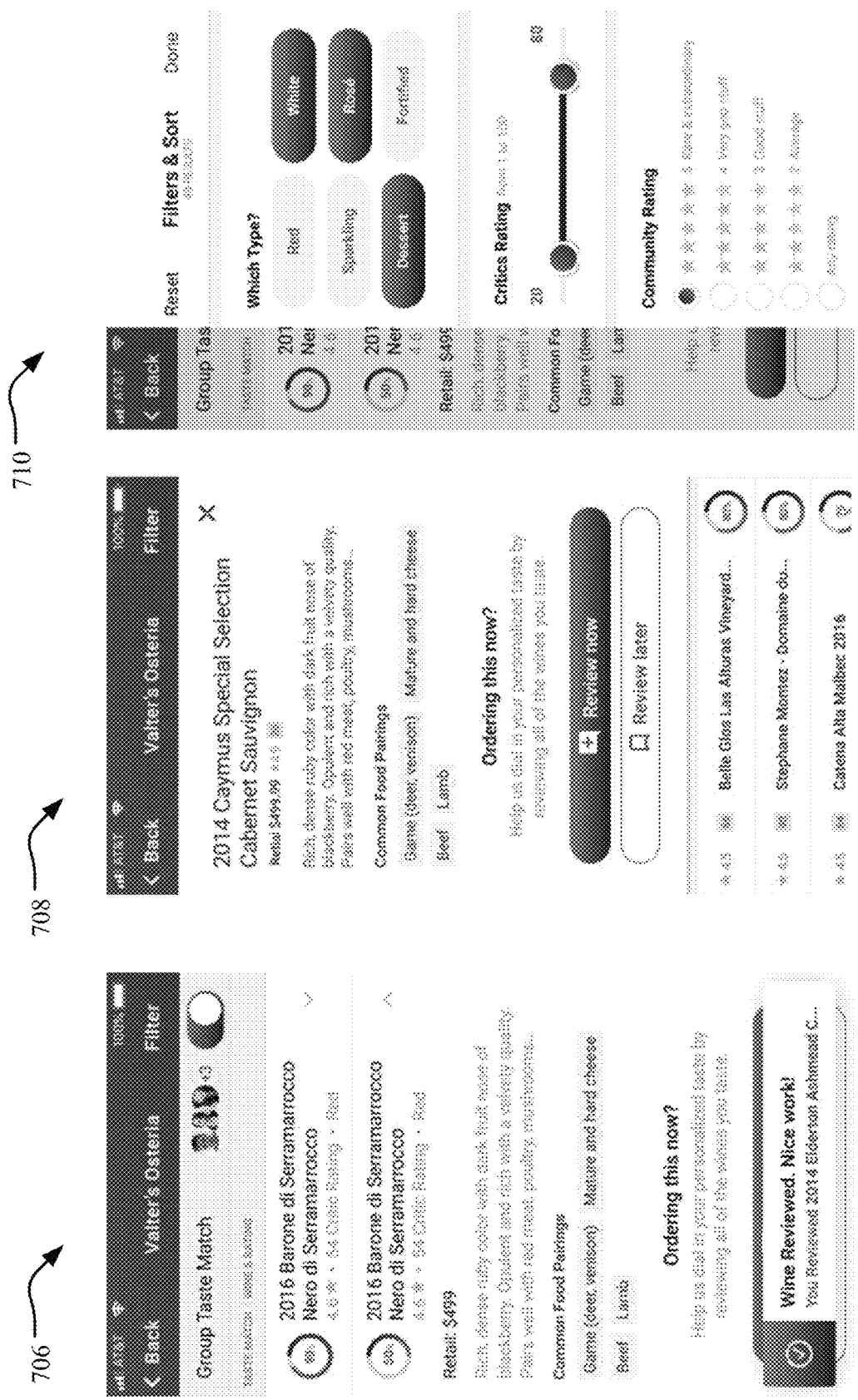
Figure 9:
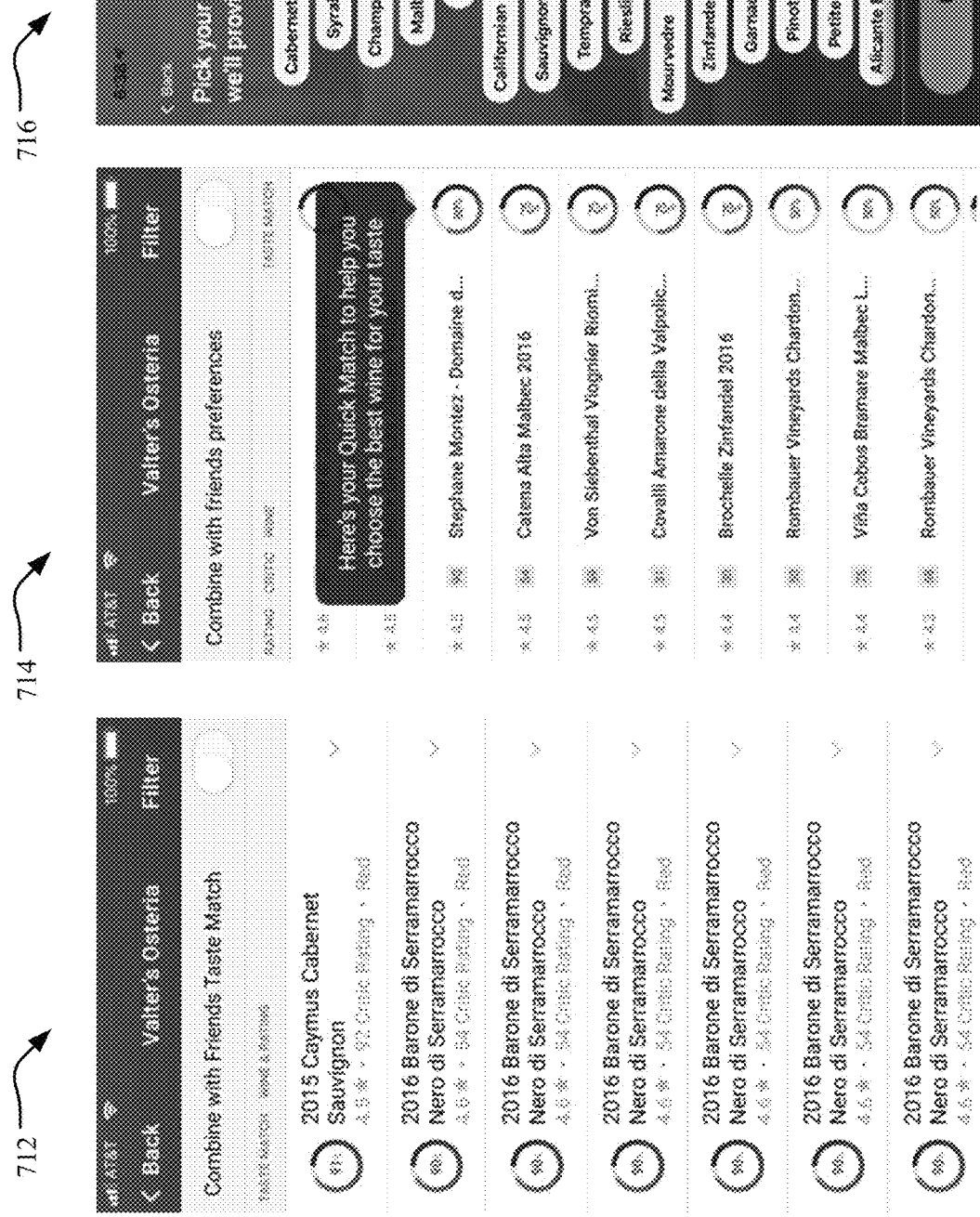
Figure 11:
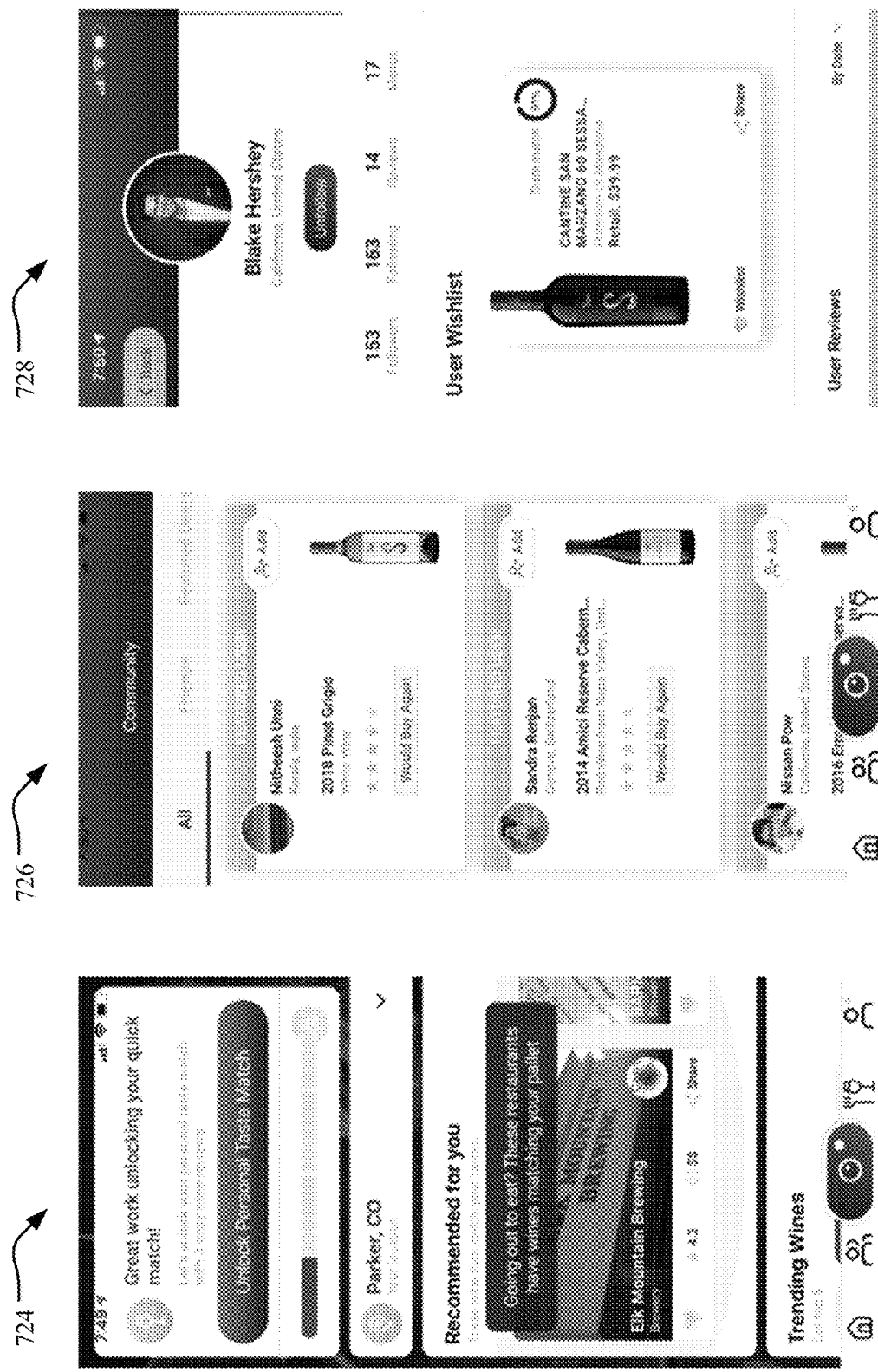
Figure 12:
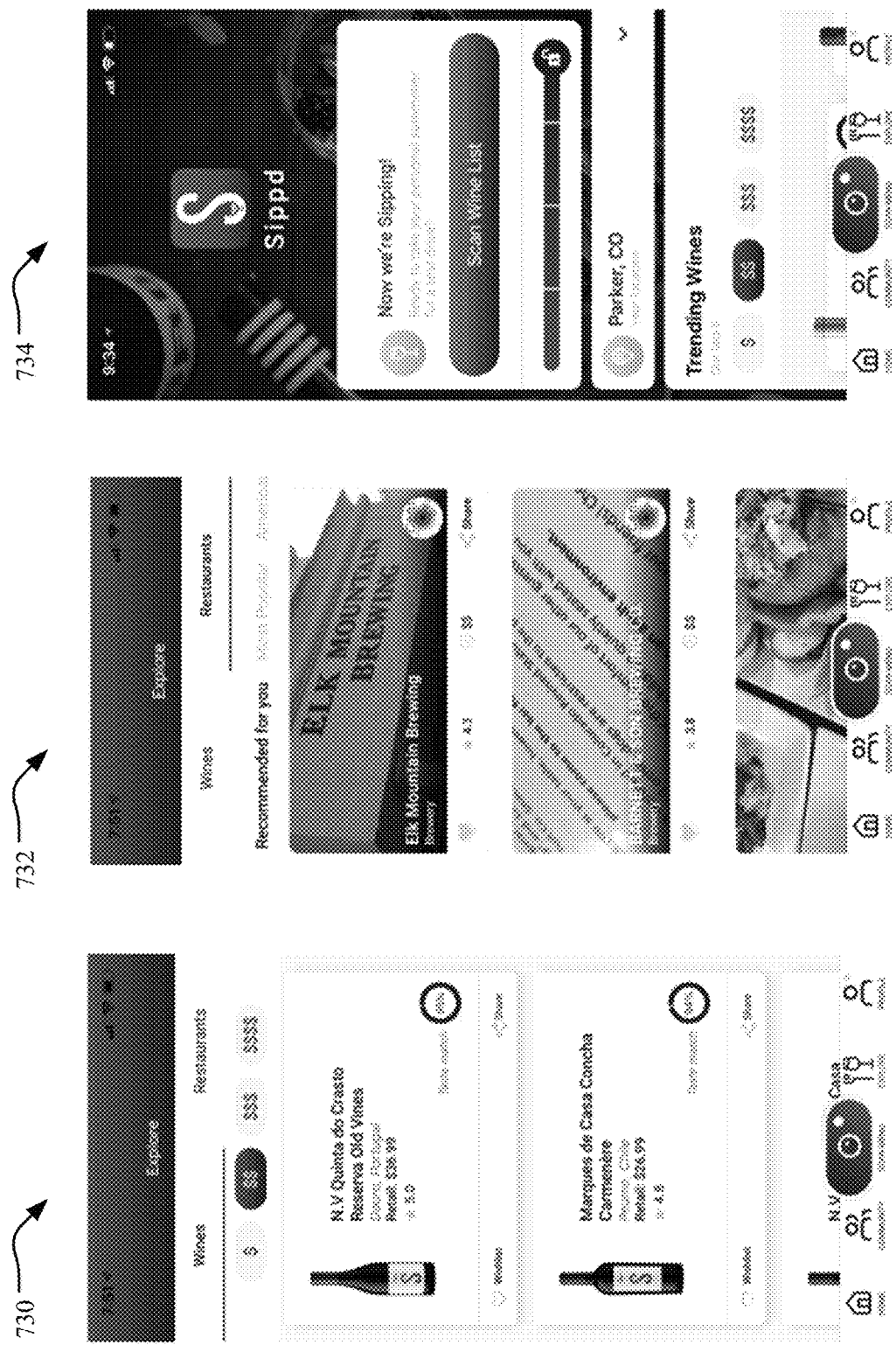
Figure 13:
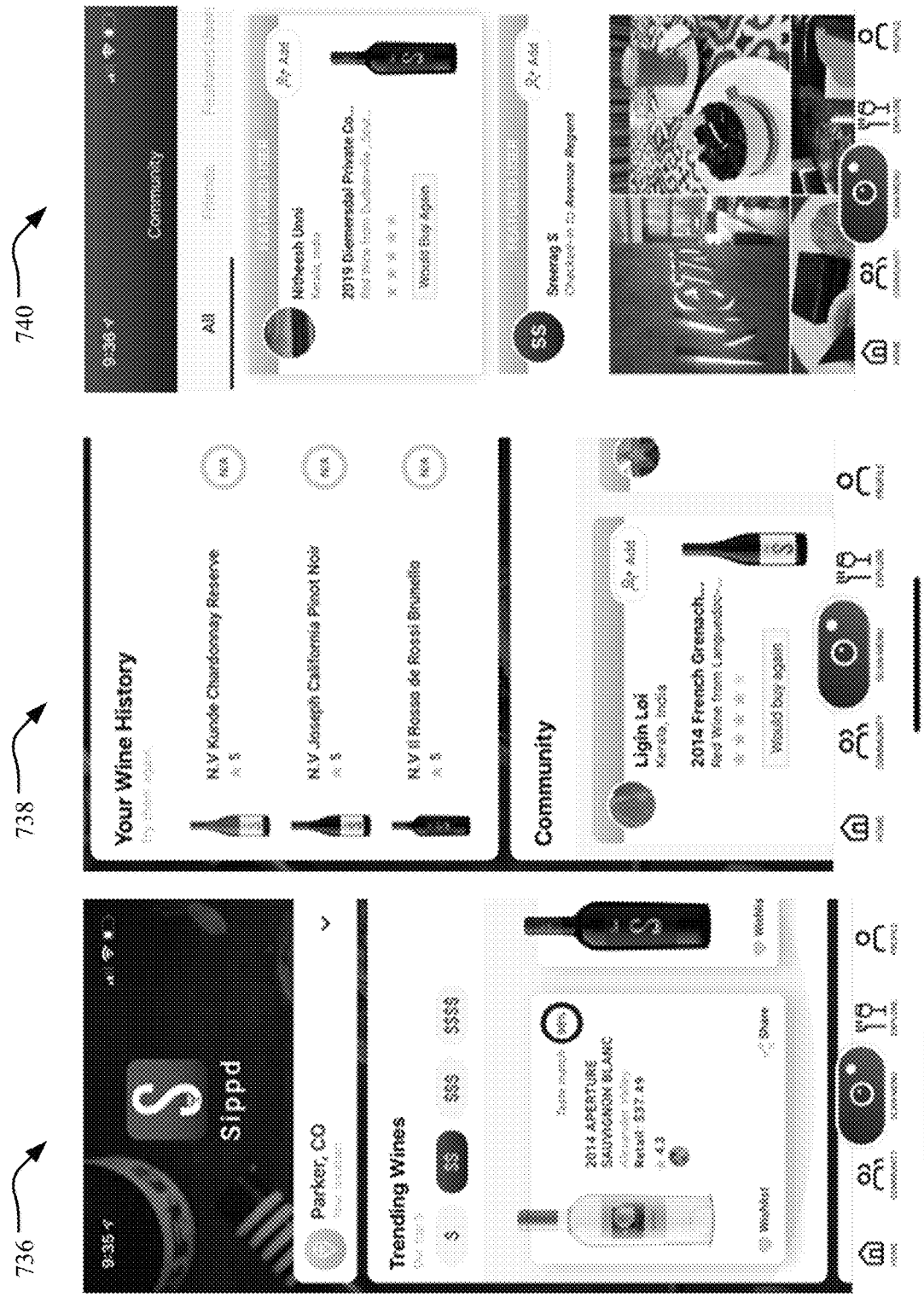
Figure 14:
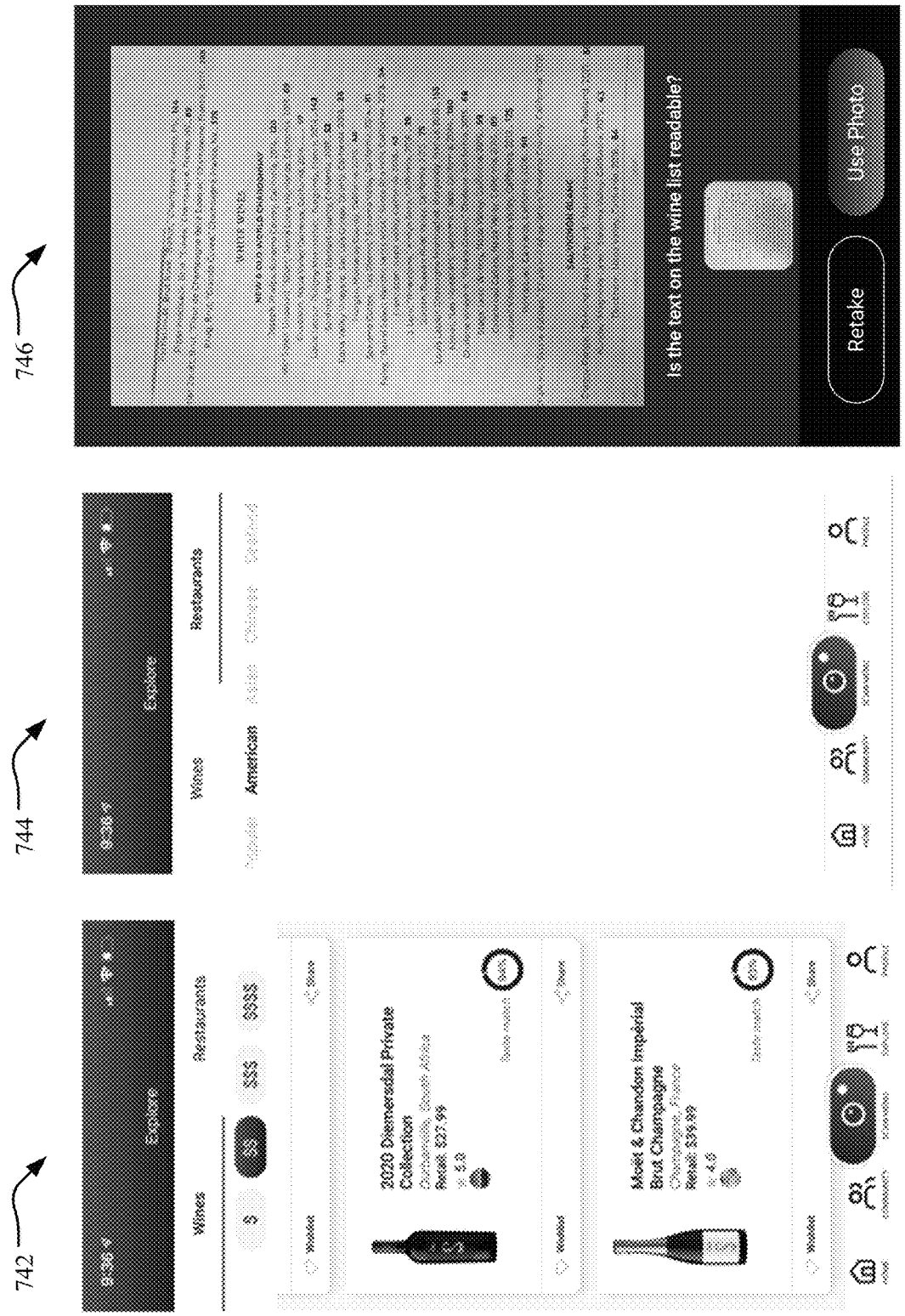

Referring to FIG. 6, a detailed description of an example computing system 600 having one or more computing units that may implement various systems and methods discussed herein is provided. The computing system 600 may be applicable to the recommendation system 102, the user device 104, the localization system 106, the distribution system 108, and other computing or network devices. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 6, including one or more hardware processors 602, one or more data storage devices 604, one or more memory devices 608, and/or one or more ports 608-610. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6.

The processor 602 may include, for example, a central processing unit (CPU), a graphics processing unit (GPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device(s) 606, and/or communicated via one or more of the ports 608-610, thereby transforming the computer system 600 in FIG. 6 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608 and a communication port 610, for communicating with other computing, network, or vehicle devices. It will be appreciated that the ports 608-610 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna or other link for electromagnetic signal transmission and/or reception.

In an example implementation, operations for generating personalized taste recommendations, and software and other modules and services may be embodied by instructions stored on the data storage devices 604 and/or the memory devices 606 and executed by the processor 602.

The system set forth in FIG. 6 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Figure 15:
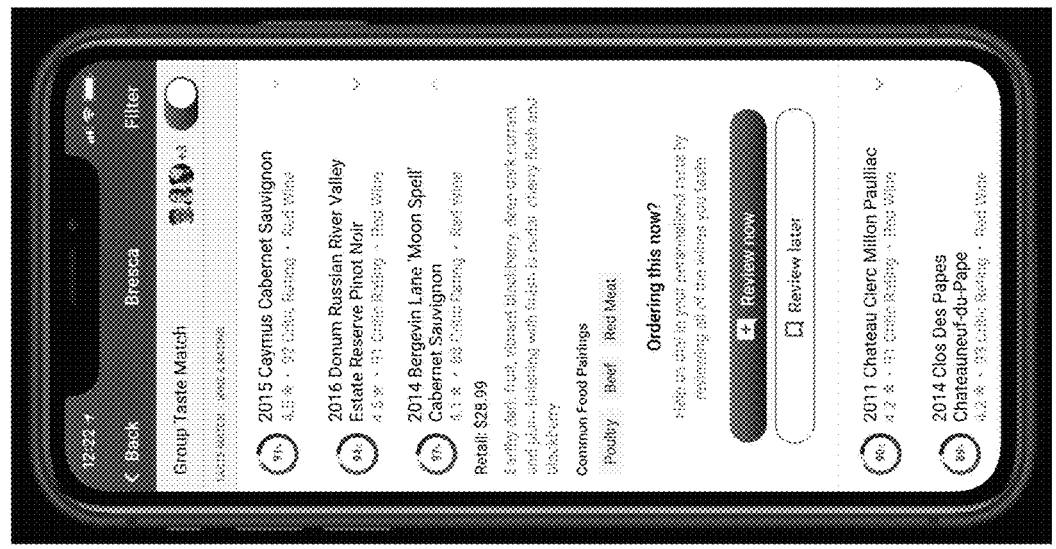

FIGS. 7-15 illustrate various example user interfaces 700-748 generated by a computing device and presented on a display of a user device through which access to and interactions with the recommendation systems and methods described herein and related data are provided. It will be appreciated by those skilled in the art that such depictions are exemplary only and not intended to be limiting. Such user interfaces 700-748 may be shown using a display screen or a portion thereof of a computing device, such as a computer or mobile device (e.g., as illustrated in FIG. 15), with various exemplary graphical user interfaces generated according to the presently disclosed technology. Each of the graphical user interfaces 700-748 includes various ornamental features. Ornamental designs of each of the graphical user interfaces 700-748 formed by each of the various features alone or in combination with one or more other features, as well as ornamental designs formed by an entirety or portions of the graphical user interfaces 700-748, are contemplated.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for personalized taste recommendation, the method comprising:
   obtaining an image set at a recommendation system, the image set having at least one image of an item list menu for a dining location, the image set captured using a camera of a user device;
   generating an item list text for the item list menu by converting the at least one image of the item list menu into extracted text;
   segmenting the at least one image in the image set of the item list menu into one or more individual orderable entries;
   generating an item entry list having one or more item entries based on a merging of the item list text with the one or more individual orderable entries;
   generating an identified item for each of the one or more item entries based on a match to a known item exceeding a confidence threshold;
   generating a personalized item list menu unique to a particular user set for the dining location by generating a personalized taste match of the particular user set for each of the one or more identified items; and
   generating a user interface to display the personalized item list menu on the user device.

2. The method of claim 1, wherein the item list menu is a wine list menu and the personalized item list menu is a personalized wine list menu.

3. The method of claim 1, wherein the particular user set includes a particular individual user or a particular group of a plurality of particular users.

4. The method of claim 3, the personalized taste match for the particular group of the plurality of particular users for a corresponding identified item from the one or more identified items is generated based on a normalization of individual internal scores for the corresponding identified item for each of the plurality of particular users.

5. The method of claim 4, wherein the normalization includes at least one of a harmonic mean of the individual internal scores or an aggregation of the individual internal scores with any negative internal score being weighted.

6. The method of claim 1, wherein the personalized taste match of the particular user set for a corresponding identified item of the one or more identified items is generated based on a translation of an internal score, the internal score generated using neural network embeddings.

7. The method of claim 6, wherein the translation is a non-linear transformation including the internal score being translated into the personalized taste match using a sigmoid function.

8. The method of claim 1, wherein the personalized taste match is a percentage match on a scale ranging from a minimum threshold to a maximum threshold.

9. The method of claim 8, wherein the scale includes a dynamic range.

10. The method of claim 1, wherein the personalized item list menu includes the personalized taste match and an expandable section for a corresponding identified item of the one or more identified items.

11. The method of claim 10, wherein the expandable section includes at least one of one or more item attributes, a community user rating, a critic rating, a description, common pairings, or tasting notes.

12. The method of claim 1, wherein the personalized item list menu unique to the particular user set for the dining location is presented with the user device.

13. The method of claim 1, wherein the item list text for the item list menu is generated in parallel with segmentation of the at least one image in the image set of the item list menu into the one or more individual orderable entries.

14. The method of claim 1, wherein the one or more item entries are further generated based on an elimination of non-item text during screening.

15. The method of claim 1, wherein an item query is generated for each of the one or more item entries, the item query returning a ranking of one or more potential matches of known items for each of the one or more item entries, a corresponding identified item of the one or more identified items being generated by selecting the known item from the ranking of one or more potential matches of known items.

16. The method of claim 15, wherein the known item is selected from the ranking of one or more potential matches of known items using a precision oriented match.

17. The method of claim 1, wherein the item list text is generated using optical character recognition.

18. The method of claim 1, wherein the at least one image is segmented into the one or more individual orderable items using a convolutional neural network.

* * * * *